United States Patent [19]

Smith et al.

[11] Patent Number: 4,881,873

[45] Date of Patent: Nov. 21, 1989

[54] CAPACITANCE LEVEL SENSOR FOR A BILGE PUMP

[75] Inventors: Leonard S. Smith, Richfield; Gary L. Cook, Bloomington, both of Minn.

[73] Assignee: Altus Technology Corporation, Minnetonka, Minn.

[21] Appl. No.: 284,172

[22] Filed: Dec. 14, 1988

[51] Int. Cl.⁴ .................. F04B 49/02; F04D 27/00; G01R 27/26

[52] U.S. Cl. .................. 417/12; 417/36; 417/44; 73/304 C

[58] Field of Search .......... 417/36, 12, 44, 45; 73/304 C

[56] References Cited

U.S. PATENT DOCUMENTS

| | | | |
|---|---|---|---|
| 4,171,932 | 10/1979 | Miller | 417/36 |
| 4,226,118 | 10/1980 | Aldrich | 73/290 V |
| 4,245,188 | 1/1981 | Rottman | 73/304 C |
| 4,470,008 | 9/1984 | Kato | 324/61 R |
| 4,484,862 | 11/1984 | Jensen | 417/36 |
| 4,678,403 | 7/1987 | Rudy et al. | 417/36 |

Primary Examiner—Carlton R. Croyle
Assistant Examiner—D. Scheuermann
Attorney, Agent, or Firm—Leo Gregory

[57] ABSTRACT

A bilge pump switch sensing the presence of bilge water by measuring the density of water by using an ultrasonic field penetrating the water, the field extending through the housing of the switch. Thus the internal elements of the switch are isolated from any contact with the water. The ultrasonic field detecting the presence of water activates sensing means in said switch housing to activate the pump, delay means being provided against false pump starts due to wave action as caused by a rocking boat.

9 Claims, 2 Drawing Sheets

CAPACITANCE LEVEL SENSOR FOR A BILGE PUMP

BACKGROUND OF THE INVENTION

1. Field of Invention

This invention relates to an ultrasonic detector to operate a bilge pump.

2. Brief Description of The Previous Art

Conventional bilge pumps have float type of switch arrangements to detect water levels in a bilge. These are subject to malfunction due to corrosion and fouling up by debris in the bilge water.

Also in conventional use are electric sensors which incur maintenance problems due to the fact that bilge water can vary greatly in conductivity as a result of its salt or oil content. The sensing elements can thus be either shorted or insulated by the bilge liquid, either causing a malfunction of the switch. These sensors also incur damage from the corrosive character of the sensing elements.

It is desirable to have a positive acting pump free from the maintenance problems of conventional controls and which can have its working parts completely sealed and isolated from contact with bilge water and which recognizes and is not caused to have false start due to splashing of the water.

SUMMARY OF THE INVENTION

This invention relates to improvement in a switching device which automatically operates a bilge pump and the working parts thereof are free from contact with bilge water.

It is an object of this invention to provide a sealed container arranged and adapted to emit ultrasonic waves to detect the presence of bilge water by its relative density.

It is a further object of this invention to provide a sealed container comprising solid state components which detect the presence of bilge water by measuring the density of the liquid present by means of the emanation of an ultrasonic field through the container. Thus there is no physical contact between the electronic elements in the device and the bilge liquid.

It is more specifically an object of this invention to provide a sealed control switch which comprises a container which encloses a circuitry having no moving parts which sense the presence of bilge water by transmitting ultrasonic waves to measure the relative density of the bilge water and to activate a pre-calibrated sensing mean which is adapted not to be activated by the presence of a tolerable amount of bilge water due to the splashing of the bilge water resulting from a rocking boat. The ultrasonic field extends through the container of the control switch whereby there is no contact of the circuitry with the bilge water.

Also the switch is adapted not to deactivate the bilge pumps until the bilge is free of any significant amount of water.

It is also an object to provide the switching device herein to have the capability of controlling the operation of a wide variety of pump sizes and types and also to have it capable of operating more than one pump at a time.

These and other objects and advantages of the invention will be set forth in the following description made in connection with the accompanying drawings in which like reference characters refer to similar parts throughout the several views.

BRIEF DESCRIPTION OF THE DRAWINGS

FIG. 1A-a broken view showing a detail of a circuit board and a sensor,

DESCRIPTION OF A PREFERRED EMBODIMENT

Figures 1, 2:
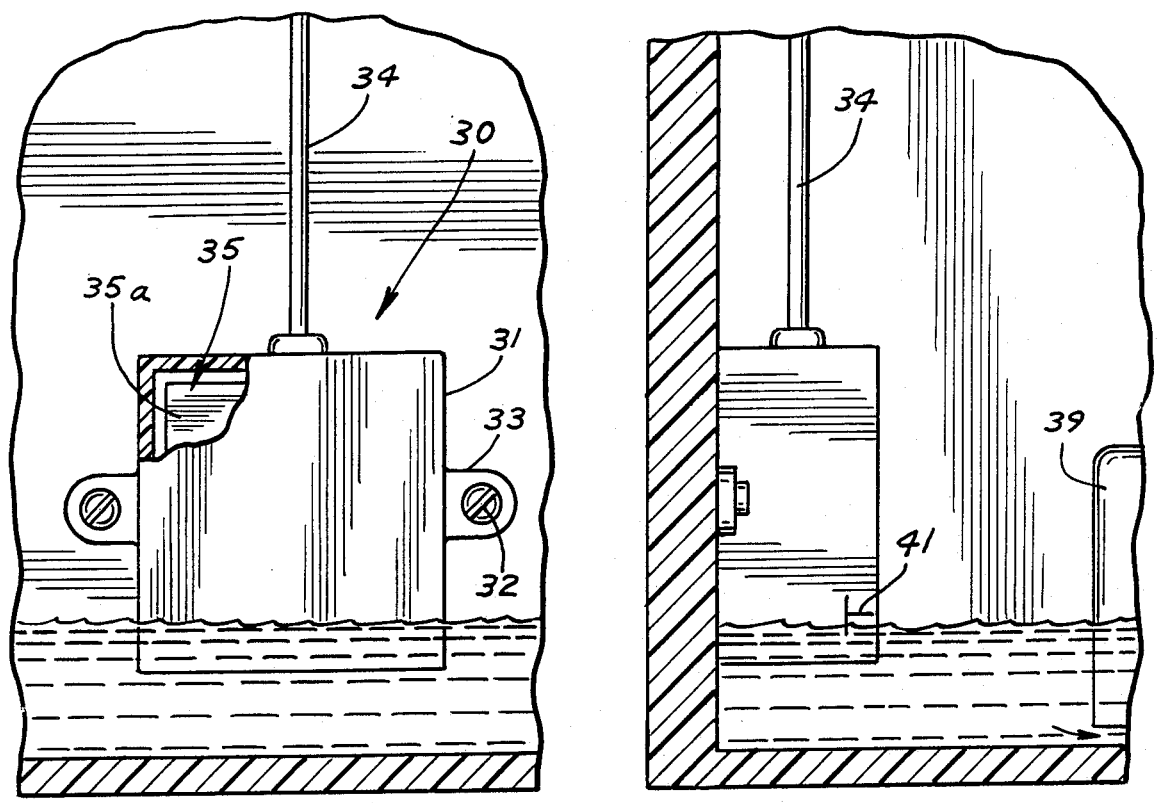
FIG. 1 is a view in front elevation of the invention herein.
FIG. 2 is a view similar to FIG. 1 in side elevation.
Figure 2A:
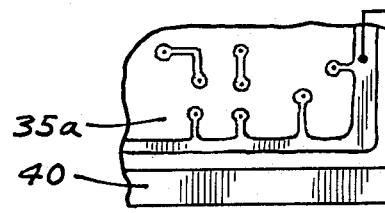

To better understand the circuitry hereinafter described, a functional statement is given.

A free running oscillator injects an electronic signal which may be an alternating or a square wave signal into a balanced voltage divider detection system comprising twin detectors. The passive side of the divider is grounded through a resistor and the active side is attached to a sensor antenna or plate. The phase shift is caused by bilge water coming into close proximity of the sensor antenna. The voltage charge on the integrating capacitor is compared to a voltage reference set on a voltage comparator. The voltage reference is the sensitivity control. With no bilge water in close proximity to the sensor, the divider is balanced and the voltage across an integrating capacitor is zero voltage.

The twin detectors will now be outputting identical square wave signals in phase and at the oscillator's frequency. The ouput of the active detector is inverted 180°. This inverted signal along with the non-inverted signal from the other or passive detector are simultaneously coupled to a phase difference detector transistor. This transistor charges an integrating capacitor in direct proportion to the amount of phase shift detected.

When a comparison is made, the comparator will output a logic low. This low enables a NOR gate and also resets the start delay timer. This timer has a five second interval in which to determine whether a body of water is present or just a splash of water. With a body of water present in the bilge, with the expiration of the delay period with the timer having timed out, the timer outputs a logic low to the other input of the NOR gate. This completes the gate and the gate outputs a logic high which is supplied to the base of a relay puller transistor through a diode or gate turning it on and thereby energizing the relay to start the bilge pump operating. The start delay timer avoids false starts. If only a splash is present, the NOR gate is not enabled and the pump is not started.

As the bilge water is removed by pumping from close proximity to the sensor, the divider detection system becomes balanced, the phase detector detects no difference and the input to the voltage comparator falls below the reference set and it now outputs a logic high which breaks the NOR gate which then outputs a logic low. The logic low resets the stop delay timer which outputs a logic high during its timing cycle which is coupled to the base of the relay puller transistor through the diode or gate, thus keeping the transistor turned on and the relay energized for the duration of the timing cycle and then turning it off. The stop delay timer for a specified period such as for five seconds, keep the bilge pump operating when otherwise it would have been shut off due to the evacuation of the bilge water. This permits the pump to expel water which tends to return from a long drain hose and otherwise expel as much water as possible.

Thus there is eliminated the need for sensors to be in physical contact with the bilge water and avoids malfunction due to corrosion, resistivity or capacitance changes in the bilge water.

Following now is a detailed description of the circuitry comprising the instant invention.

Figure 3:
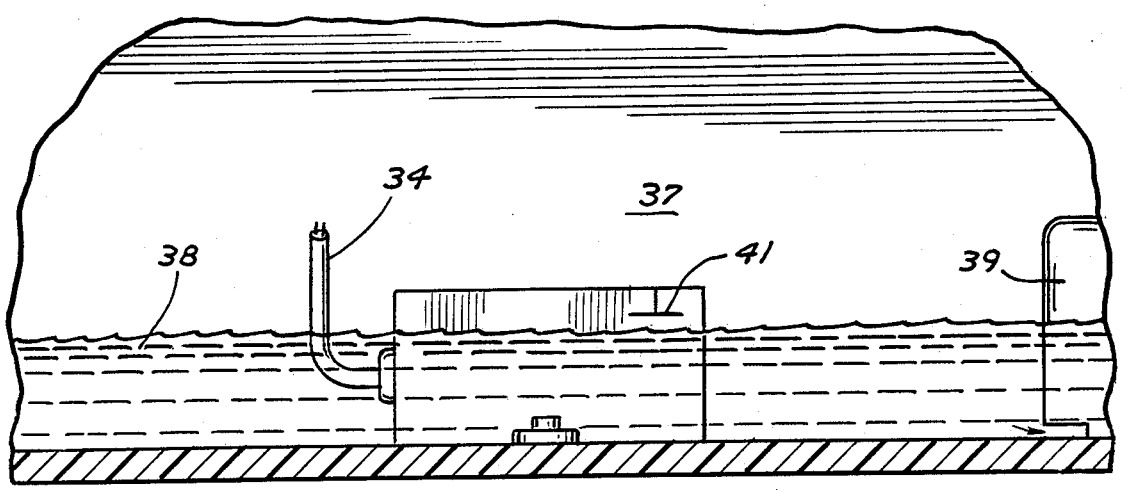
FIG. 3 is a view similar to FIG. 1 in front elevation showing the device in an alternate bottom based position.

FIGS. 1-3 show the container or housing 31 of the device 30 herein.

Said container is of a fairly small size being generally parallelpiped in form and being shown in its present embodiment conventionally secured to a supporting surface by screws 32 extending through apertured tabs 33. A line 34 provides a connection to a power source.

The device is illustrated in alternate operating positions in a bilge 37 in which a bilge pump 39 is indicated operated by said device. Bilge liquid or water is indicated at 38.

Figure 4:
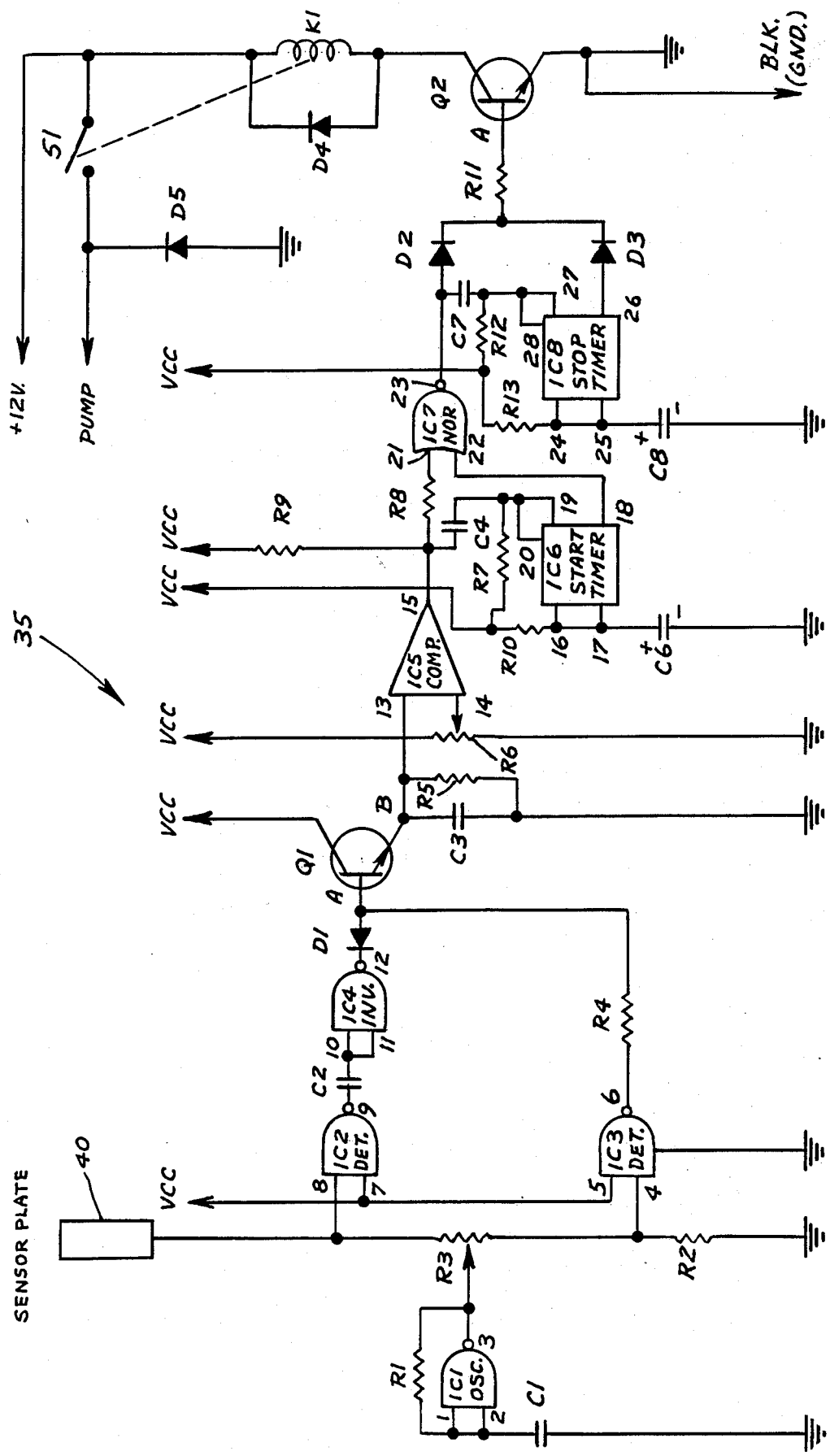
FIG. 4 is a diagrammatic wiring diagram.

Referring to FIG. 4, a diagrammatic circuitry 35 comprising an ultrasonic field is shown indicating one means of operation and comprising a plurality of detector circuits. Said circuitry 35 in FIG. 1 is indicated as being mounted onto a board 35a and includes a sensor plate or antenna 40 as an extension thereof, the location of which is indicated by the water line marking 41 at which level water is in sufficient proximity to said plate to activate the circuitry.

Ultrasonic refers to a frequency above the audible range which is above 20,000 hz and may extend into the FM radio frequency range of 30,000 hz and upwards. What has been selected from the present embodiment is 25,000 hz for practical reasons as it does not interfere with other related environmental frequencies. What is created here is an ultrasonic field which is in connection with a circuit which is tuned or balanced in the presence of air. The ultrasonic field passes through and extends about the housing. The presence of water upsets the tuned circuit. The detector 1C2 has its input 8 connected to a sensor plate or antenna 40. The detector has its input 4 connected through a resistor R2 to ground. The resistor is chosen to match the impedance of said sensor plate in the presence of air. The presence of water upsets the balance of impedance which in turn causes the circuitry to activate the bilge pump.

The circuitry comprises an oscillator 1C1 of which the frequency in the ultrasonic range is determined by the values of the resistor R1 and capacitor C1 connected to its inputs 1 and 2. The output of said oscillator is coupled through the resistor R3 into the inputs 4 and 8 respectively of detectors 1C2 and 1C3. The detector 1C2, the active detector herein, has its input 8 connected to said sensor plate or antenna 40 which becomes an electrical load in the proximity of water. The detector 1C3, a passive detector, has its input 4 connected through a resistor R2 to ground. This resistor is chosen to most nearly match the impedance of said sensor plate 40 when no water is in close proximity to said sensor plate 40. The said detectors sense only an electrical inbalance of the tuned circuit.

The resistor R3 connected between the two detector inputs 4 and 8 is a balancing network which is used to eliminate any differences in the lead lengths and gains of the two detectors insuring that the outputs of both detectors are identical. Each integrated circuit has a connection to the main power source VCC and to the battery negative.

The element 1C4 is an inverter, the purpose of which is to effect a 180° inversion of the output signal at the point 9 of said 1C2 detector and its outputs 10 and 11 through the coupling capacitor C2.

The output of the inverter 1C4 at point 12 is coupled through the isolation diode D1 to the input A of the integrator transistor Q1. Also the output of the passive detector at its point 6, which is not inverted, is coupled through resistor R4 to the input A of the integrator Q1. Since the signal from the inverter 1C4 is 180° out of phase with the signal from the passive detector 1C3, these signals will cancel out each other leaving a net signal voltage of zero on the input A of said integrator Q1 if no water is in close proximity to the sensor plate 40.

When any bilge water is present close to the sensor plate 40, the ultrasonic field is influenced by the presence of water and affects the balance of the active detector 1C2 causing a phase shift in its output signal with respect to the passive detector 1C3. This phase shift will not be cancelled by the passive detector 1C3 and will result in a signal voltage on the input A of the integrator Q1. This input signal is directly proportional to the magnitude of the phase shift between said two detectors 1C2 and 1C3.

The output B of said integrator transistor Q1 charges capacitor C3 at a rate directly proportional to the input signal it receives. This charge is stored in the capacitor C3 and forms a signal voltage which is then impressed on one input 13 of the comparator 1C5.

A resistor R5 is connected across the capacitor C3 and serves as a load resistor or bleeder to discharge the capacitor C3 if no signal pulses are occurring. The other input 14 of the comparator 1C5 is adjusted by a resistor R6 which is used to set a minimum threshold level for the signal output. This threshold also eliminates possible transient signals from operating the entire circuitry.

When the input signal of the comparator C5 is less than said threshold level or preset signal level, the output at point 15 will be a logic high through the pull up resistor R9. When the input signal of the comparator 1C5 equals the preset signal level, the 1C5 output at point 15 will drop to a logic low. This logic low is coupled through a resistor R8 into an input 21 of NOR gate 1C7. This logic low also is coupled through a capacitor C4 and resistor R7 to reset the Delay Start Timer 1C6.

The resistor R10 and capacitor C6 form the RC network which determines the time duration for Delay Start Timer 1C6. When said Delay Start Timer 1C6 begins timing its outputs at its point 18 a logic high into the other input 22 of said NOR gate keeping the NOR gate disabled until the timer times out, at which time it outputs a logic low at point 18 and the NOR gate's output at point 23 will shift to a logic high.

If at any time during the timing cycle of 1C6, the signal from the comparator 1C5 is interrupted, then said 1C6 is immediately reset and begins a new timing cycle. This will continue until both said 1C5 and said Delay Start Timer 1C6 are outputting simultaneously low outputs to the NOR gate 1C7. Only if both conditions exist, that is, if the signal is maintained by 1C5 and the Delay Start Timer has timed out can the NOR gate effect an output.

When the NOR gate effects an output its output signal at its point 23 is a logic high which goes through the isolation diode D2 and resistor R11 into the input A of the relay puller transistor Q2 turning Q2 on and energizing a relay coil K1 and closing relay contact S1 which starts the pump. Said coil K1 has a transient signal suppressing diode D4 across its coil and another transient signal suppressing diode D5 from its contacts to ground.

When the logic high output signal from point 23 of NOR gate 1C7 is lost or dropped to a logic low, the Stop Delay Timer 1C8 becomes immediately reset through capacitor C7 and resistor R12 and continues to provide an input signal from its output point 26 for the relay driver transistor Q2 through its isolation diode D3 and resistor R11.

During this period, the transistor Q2 is provided an uninterrupted signal and the relay K1 stays energized at the same time, the Delay Stop Timer 1C8 times out as determined by the time constant resistor R13 and capacitor C8 and once the time out is complete, the output from point 26 of the Delay Stop Timer 1C8 drops to a logic low and ceases to drive the driver transistor Q2. In effect then, the transistor Q2 is held for an additional time period which is determined by the time constant of said Stop Delay Timer 1C8 after it has lost its signal from said NOR gate. This additional time allows the pump to run and clear any discharge hose connected thereto of any water which may be present after the sensor plate 40 has lost its signal from the presence of bilge water. This will eliminate both back flow and recycling through the discharge or drain hose.

The contacts S1 of the relay K1 are used to directly switch the bilge pumps on or off. They can be of various load ratings and can operate one or more pumps at one time. Since the load circuit is switched by contacts, it is not encumbered by voltage drops, heating or limited current ratings which are necessary when using semiconductor switches.

It is believed that with the preceding functional statement taken with the above description, that the make up and operation of the circuitry is well understood.

This device has tested out very successfully.

It will of course be understood that various changes may be made in form, details, arrangement and proportions of the parts without departing from the scope of the invention herein which generally stated, consists in an apparatus capable of carrying out the objects above set forth, in the parts and combination of parts disclosed and defined in the appended claims.

What is claimed is

1. An automatic bilge pump control device in connection with a bilge pump, having in combination
   a sensor plate,
   an oscillator injecting an alternating wave signal into
      a balanced voltage divider comprising a passive and active pair of detectors outputting identical square wave signals,
   a resistor,
   the passive one of said detectors being grounded through said resistor,
   the active one of said detectors being in circuit with said sensor plate and its square wave signal being inverted 180° relative to said other detector,
   a phase shift detecting integrating transistor in circuit with said voltage divider having said wave signals coupled thereto,
   an integrating capacitor charged by said integrating transistor in direct proportion to any phase shifting detected,
   said phase shifting being responsive to the presence of bilge water in sufficiently close proximity to said sensor, and
   means responsive to said phase shifting detected causing said pump to operate.

2. The structure of claim 1, wherein
   said wave signals, in the absence of bilge water being in close proximity to said device, cancel each other out leaving a net zero voltage resulting in no phase shifting.

3. The structure of claim 1, including
   a voltage comparator,
   said detected phase shifting causing a proportional signal voltage at a input of said comparator,
   a reference voltage set into said comparator,
   a NOR gate,
   a start delay timer,
   said voltage comparator upon making a compare with said input signal voltage, outputting a logic low,
   said logic low being output to an input of said NOR gate enabling said NOR gate and thereby resetting said start delay timer and said timer upon timing out, outputting a logic low to another input of said NOR gate completing said gate,
   a relay puller transistor in connection with an NOR gate, and
   said NOR gate outputting a logic high applying the same to a base of said relay puller transistor through said NOR gate energizing said relay puller transistor and starting the operation of said bilge pump.

4. The substance of claim 3, wherein
   in the absence of bilge water being in close proximity to said sensor plate, said voltage divider is in a balanced state and said input to said voltage comparator falls below said set reference voltage causing said comparator to output a logic high,
   said logic high input to said NOR gate breaks said gate, and
   said NOR gate outputs a logic low resetting said stop delay timer for the duration of its delay timing cycle.

5. The structure of claim 4, wherein
   said logic low output of said NOR gate is coupled to the base of said relay puller transistor through said stop delay timer energizing said relay puller transistor for the duration of the delay timing cycle of said stop delay timer.

6. The structure of claim 4, wherein
   a momentary output of said comparator resets said stop delay timer to re-start the delay start timing cycle.

7. The structure of claim 4, wherein
   said stop delay timer keeps energized said relay puller transistor and said relay after bilge water has receded from being in close proximity to said sensor plate.

8. An automatic bilge pump control device in connection with a bilge pump, having in combination
   a sensor,
   means injecting an electronic signal into a balanced voltage divider creating an ultrasonic field, detectors outputting identical square wave signals,
   a resistor,
   a passive one of said detectors being connected to the negative side of the power source through said resistor, an active one of said detectors, being in circuit with said sensor and said square wave signals at an ultrasonic frequency, being inverted 180° relative to said signals of said passive detector, a phase shifting detection means having square wave signals coupled thereto, an integrating capacitor charged by said last mentioned means in direct proportion to said phase shifting detected, said phase shifting being responsive to the presence of a liquid being in close proximity to said sensor, and means caused by said detected phase shifting to operate said pump.

9. An automatic bilge pump control device in connection with a bilge pump, having in combination a sensor, means injecting an electronic signal into a balanced voltage divider creating an ultrasonic field, detectors outputting identical square wave signals, a resistor, a passive side of said voltage divider connected to the power supply negative through said resistor, an active side of said voltage divider being in circuit with said sensor and said square wave signals and being inverted 180° relative to said signals of said passive side, a phase shifting detection means having said signals coupled thereto, an integrating capacitor being charged by said last mentioned means in direct proportion to the phase shifting detected, and said phase shifting being responsive to the presence of liquid in close proximity to said sensor, and means caused by said detected phase shifting to operate said pump.

* * * * *